United States Patent
Crawford et al.

(10) Patent No.: US 8,898,231 B2
(45) Date of Patent: Nov. 25, 2014

(54) TEMPORALLY ASSOCIATING A USER WITH A LOCATION

(75) Inventors: Michael Crawford, Newry (GB); Hussam Eid, Amman (JO); Fintan Fairmichael, Belfast (GB); Bill Looby, Dublin (IE); Kevin Tadgh O'Riordan, Tivoli Cork (IE); Michael Roche, Dublin (IE); Stephen Joseph Tapley, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 11/760,663

(22) Filed: Jun. 8, 2007

(65) Prior Publication Data

US 2007/0299966 A1  Dec. 27, 2007

(30) Foreign Application Priority Data

Jun. 22, 2006  (GB) .................................. 0612359.0

(51) Int. Cl.
- G06F 15/16 (2006.01)
- G06Q 10/00 (2012.01)
- H04L 29/08 (2006.01)
- G06Q 10/02 (2012.01)

(52) U.S. Cl.
CPC ................ G06Q 10/02 (2013.01); H04L 67/18 (2013.01); H04L 67/12 (2013.01)
USPC .......................................... 709/204; 705/7.19

(58) Field of Classification Search
CPC .... G06Q 10/02; G06Q 10/06; G06Q 10/0631
USPC .............................. 709/204, 205; 705/8, 7.19
See application file for complete search history.

(56) References Cited

U.S. PATENT DOCUMENTS

| | | | | |
|---|---|---|---|---|
| 5,124,912 A * | 6/1992 | Hotaling et al. | ................... | 705/9 |
| 6,064,976 A * | 5/2000 | Tolopka | ............................ | 705/9 |
| 6,396,413 B2 | 5/2002 | Hines et al. | | |
| 6,658,095 B1 * | 12/2003 | Yoakum et al. | ............. | 379/93.01 |
| 6,845,370 B2 * | 1/2005 | Burkey et al. | ...................... | 707/3 |
| 6,982,639 B2 | 1/2006 | Brackett et al. | | |
| 2004/0229560 A1 | 11/2004 | Maloney | | |
| 2006/0015376 A1 * | 1/2006 | Sattler et al. | ...................... | 705/5 |
| 2007/0162315 A1 * | 7/2007 | Hodges | ........................... | 705/8 |
| 2007/0268130 A1 * | 11/2007 | Yee et al. | ...................... | 340/540 |

FOREIGN PATENT DOCUMENTS

WO  2005013231  2/2005

* cited by examiner

*Primary Examiner* — Boris Gorney
(74) *Attorney, Agent, or Firm* — David A. Dagg (57) ABSTRACT

A system for temporally associating a user with a location. The system includes a receiving component for receiving identity data from an electronic sensor, the identity data being indicative of a user's presence being detected at a location at a given time. The receiving component further receives scheduling information about the availability of the location for the given time, and an analysis component determines from the scheduling information and the user's detected presence whether the location is available for use by the user.

25 Claims, 4 Drawing Sheets

TEMPORALLY ASSOCIATING A USER WITH A LOCATION

CROSS REFERENCE TO RELATED APPLICATIONS

The present application claims priority under 35 USC 119 to United Kingdom Application Number GB0612359.0, filed Jun. 22, 2006.

FIELD OF THE INVENTION

The invention relates to the field of resource management. In particular, the invention relates to an apparatus for temporally associating a user with a location.

BACKGROUND OF THE INVENTION

Managing resources is an expensive and time consuming process. The resources being managed are also an expensive commodity. Resources, such as meeting rooms, conference rooms, auditoriums, work rooms, social areas, buildings etc may be left empty for long periods of time or may have been reserved for use by a person for a long period of time. It is often not unheard of for people to book conference rooms for days on end in the unlikely event that they may use them, but often these conference rooms are left empty. Tools exist in which users may reserve resources for their use, however these tools often have disadvantages. For example, some tools do not take into account the dynamic nature of a user's activities, e.g. when a user has reserved a room for two hours but only uses the room for an hour—the room is left empty and could by utilized by another user. Some existing tools also require the manual input of scheduling details by a user and require a lot of effort on a user's and administrator's part to keep the scheduling information up to date and current.

Thus there is a need in the art for an effective solution to the above described problems.

SUMMARY OF THE INVENTION

To address shortcomings of previous approaches, an apparatus for temporally associating a user with a location is disclosed. The disclosed apparatus includes a receiving component for receiving identity data from an electronic sensor, the identity data being indicative of a user's presence being detected at a location at a given time. The receiving component receives scheduling information about the availability of the location for the given time, and an analysis component determines from the scheduling information and the user's detected presence whether the location is available for use by the user.

The disclosed system allows a location to know who is in the location at any given moment in time. By users carrying electronic tags and electronic sensors being placed at entry and exit points in a location, such as a building, conference room, meeting room or office space, the location will know who has entered and exited the location. The electronic tag broadcasts or emits identity data about a person or a user. The electronic sensor receives or requests the identity data. The electronic sensor also receives information from a directional sensor in order to determine if a person has entered or exited the room. The identity data is sent to an automated resource scheduler component in which the identity data along with the time of entry into the location is used to perform a lookup against a scheduling database to determine if the location is unavailable because it has already been reserved by a user and if so, whether the user represented by the identity data is the user that has reserved the location. If the determination is positive, the automated resource scheduler determines if there are participants associated with the user and who should also be in the location at the same time as the user.

The automated resource scheduler waits for identity data to be received for the associated participants. If after a predetermined amount of time identity data is not received for some or all of the associated participants, the automated resource scheduler notifies those participants of their absence. The notification may take the form of email, instant messaging service or voice communication.

When a user is detected entering a location and the location is available for use, the automated resource scheduler reserves the location for the user's use, until the next timeslot which been booked by another user. Another advantageous feature is provided via the combination of electronic tags, electronic sensors and the automated resource scheduler, which makes it possible to detect when a user leaves the location and potentially modify a related reservation. Thus, for example, if a location is reserved for a user for two hours and after the first hour the user leaves the location and after twenty minutes the user does not come back, the automated resource scheduler can update the scheduling records to show that the location is now available for use. The automated resource scheduler may also notify the user that their location reservation for the last hour has been canceled.

Thus, advantageously, the automated resource scheduler component can dynamically reserve, cancel and modify reservations by dynamically associating users with a location for a give time period. Accordingly, based on the users' actions of entering and leaving a location, location resources, such as buildings, rooms, offices, etc. can be managed.

A method disclosed herein for temporally associating a user with a location includes receiving identity data from an electronic sensor, the identity data being indicative of a user's presence being detected at a location at a given time, receiving scheduling information about the availability of the location for the given time, and determining from the scheduling information and the user's detected presence whether the location is available for use by the user.

In one embodiment, a computer program product, loadable into the internal memory of a digital computer, includes software code portions stored on a computer readable medium, for causing, when executed on the computer, the computer to carry out the steps for temporally associating a user with a location disclosed herein.

In another embodiment, a data processing system for temporally associating a user with a location includes a central processing unit, a memory device and a storage device adapted for carrying out the steps for temporally associating a user with a location disclosed herein.

BRIEF DESCRIPTION OF THE DRAWINGS

Embodiments of the present invention will now be described, by way of examples only, with reference to the accompanying drawings in which.

DETAILED DESCRIPTION OF EXEMPLARY EMBODIMENTS

Figure 1:
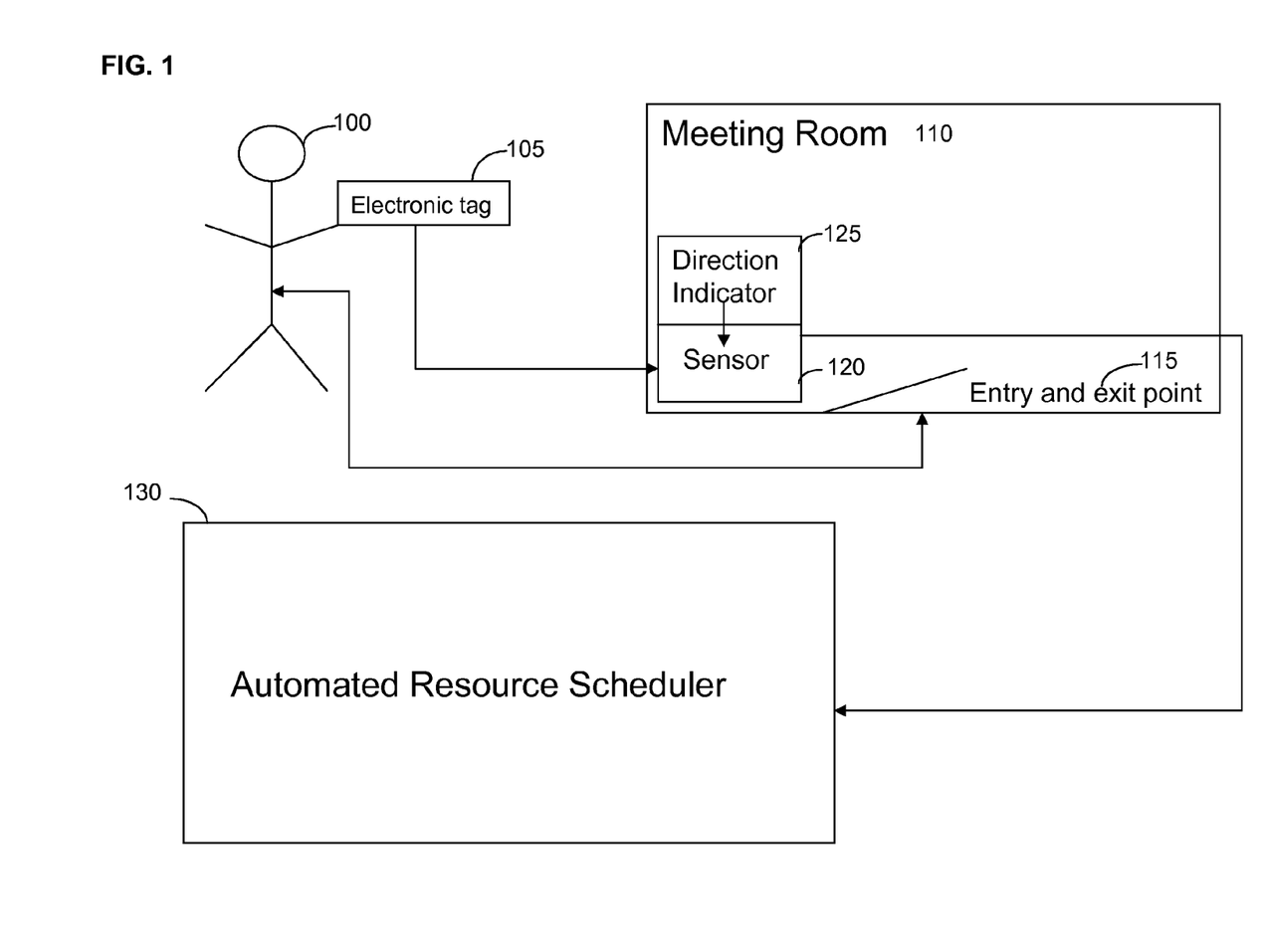
FIG. 1 is a schematic representation of a system of tag identification in a meeting location environment, in accordance with an illustrative embodiment.

With reference to FIG. 1, an automated resource scheduler application 130 is provided, a user 100 is provided with an electronic tag 105, and a location 110, such as a room, building, office, or area etc., is provided with an electronic sensor 120. The sensor 120 detects radio frequency waves emitted by the electronic tag 105. The electronic tag 105 includes information unique to the user 100. The automated resource scheduler 130 monitors sensor information transmitted from the electronic sensor 120. Depending on the information received from the electronic sensor 120 and information received from a calendaring function, the automated resource scheduler 130 either schedules a location as available or unavailable, and/or notifies participants of their non-attendance i.e. with respect to an arranged meeting, and/or updates the calendaring function with new status information.

An embodiment of electronic tag 105 is provided by Radio Frequency Identification (RFID) technology, although other forms of tags and sensors may be used.

Radio frequency identification (RFID) technology may be used in which electronic tags 105 are provided in the form of transponders that are embedded in items to act as identifiers. Readers or scanners on the sensor 120 act as an interface between the transponders and a data environment including the automated resource scheduler 130. Conventional transponders and readers are available in a number of forms. Any suitable form can be used for the purposes of the disclosed system.

An antenna located on the sensor 120 emits radio signals to activate the electronic tag 105 and to read data from it and/or write data to it. Antennas can be built into a door frame, for example, to receive electronic tag data from persons or objects passing through the door. The electromagnetic field produced by an antenna can be constantly present when multiple electronic tags 105 are expected continually, or, if constant interrogation is not required, the field can be activated by the sensor device 120.

The antenna has a transceiver and decoder to provide a reader. When an electronic tag 105 passes through the antenna zone, it detects the reader's activation signal. The reader decodes the data encoded in the tag's integrated circuit and the data is passed to a host computer for processing.

The tag 105 may be either active or passive. Active RFID tags are powered by an internal battery and are typically read/write. Passive RFID tags are read only and operate without a power source by obtaining operating power generated from the reader. The advantage of RFID tags is that they do not require contact or line-of-sight to be read.

One or more electronic tags 105 can be inserted into any form of object at the time of manufacture and may remain in the object until the object is destroyed. It may also be possible to destroy or deactivate the electronic tag 105 before the object hosting it is destroyed. Similarly an electronic tag 105 may be added to an object at any time during the lifetime of the object.

A user 100 carries an electronic tag 105 which may be embedded into a chip into a user's security badge, for example. The user enters into a location such as meeting room 110 through an entry and exit point 115. The entry and exit point 115 includes one or more electronic sensors 120 for sensing the presence of and receiving information from the user's electronic tag 105. The entry and exit point 115 further includes a directional indicator 125 for sensing if a user has entered or exited the meeting room 110. The sensor 120 receives an ID which is unique to the user 100 from the electronic tag 105. The electronic sensor 120 combines this information with information from the directional indicator 125 and transmits the combined information across a communication network for receipt by the automated resource scheduler 130. For purposes of explanation herein, the term "location" will be understood to refer to a room, building, area, office and other specific types of locations in which the disclosed system may be operable.

The automated resource scheduler 130 receives information from the sensor 120, and determines, based on the received information, if the user is supposed to be in the meeting room 110. If the user 100 is supposed to be in the meeting room 110, the automated resource scheduler 130 determines if there are supposed to be further participants in the meeting room 110, which are associated with the user 100, e.g. further participants for the user's meeting. If the determination is positive, the automated resource scheduler 130 waits for further data from the sensor 120 in order to determine who has entered the location and who has not. If, for example, five minutes after the meeting was due to start, some participants have not arrived, the automated resource scheduler 130 may generate a notification via email, instant messaging or an automated voice alert, to notify the non-attending participants of their absence.

In another example, if a user 100 is detected as entering a meeting room 110 and the user 100 is not supposed to be in the meeting room 110 because they have not booked the meeting room 110, and the location is in fact already booked by another user, the automated resource scheduler 130 generates a notification to the user 100 informing the user 100 that the meeting room 110 is unavailable at this time. The automated resource scheduler 130 may also inform the user 100 of the dates and times at which the meeting room 110 is available for booking. If however, the meeting room 110 is available for booking, and user 100 enters meeting room 110, using the user's unique ID, the automated resource scheduler 130 books the meeting room 110 on behalf of the user 100 until the next booked time slot.

Figure 2:
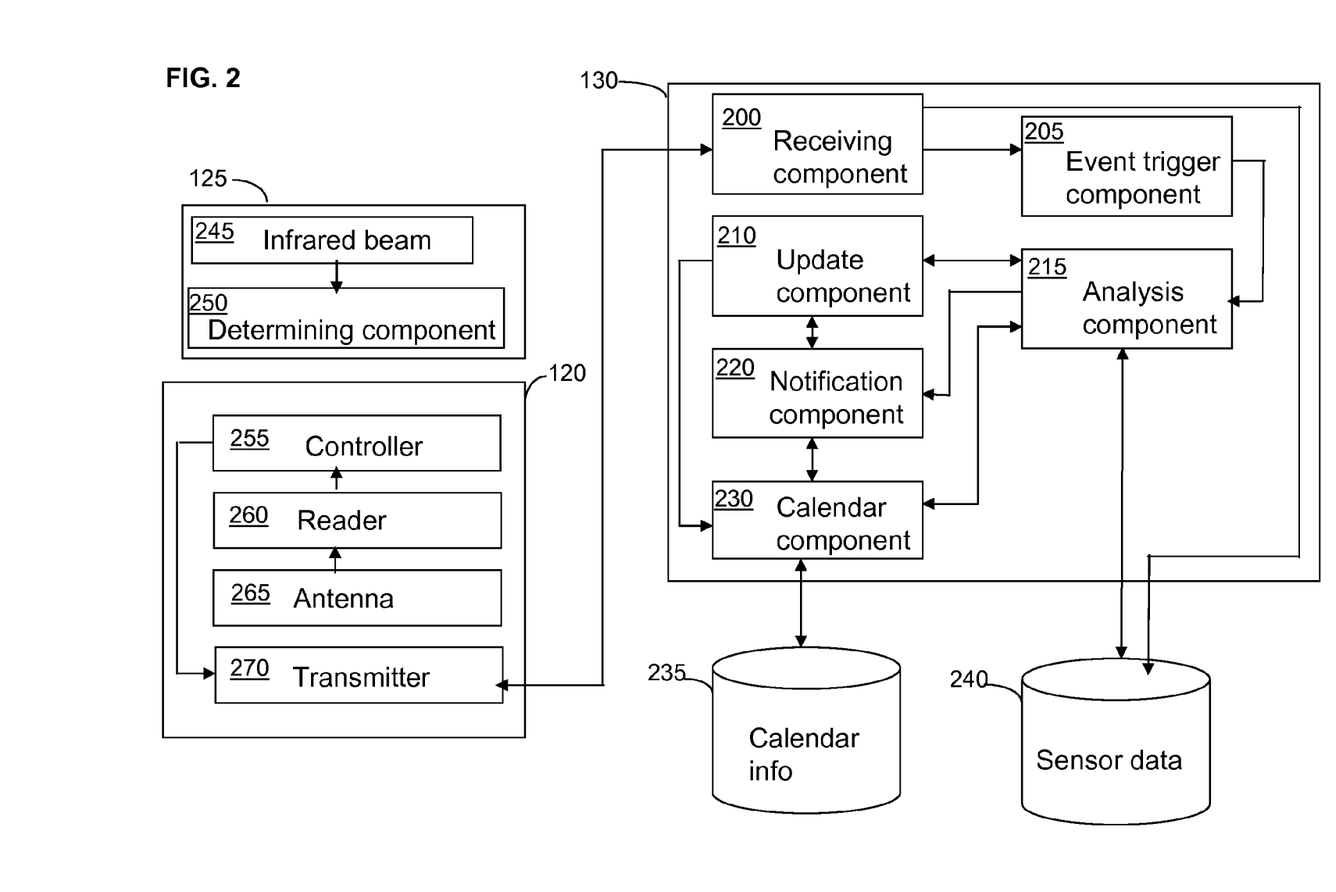
FIG. 2 is a block diagram showing the automated meeting location scheduler along with the individual components of an RFID sensor and a directional sensor in accordance with an illustrative embodiment.

Moving to FIG. 2, the various components of an illustrative embodiment of the automated resource scheduler 130, the sensor 120 and the directional indicator 125 are shown. Each of these components will be explained in turn.

As previously explained, entry and exit point 115 includes an electronic sensor 120 and a direction indicator 125. The direction indicator 125 provides at least one infrared beam 245 which is beamed across the width of the entry and exit point 115. Two beams may be placed horizontally so that when a user 100 enters or exits the location they are broken in sequence. Based on the sequence in which the beams are broken, it can be determined whether user 100 was entering or exiting the location. This information is stored, and an identifying component 250 communicates the information to a controller 255 located on the sensor 120.

An antenna 265 detects the presence of an electronic tag 105, and a reader component 260 decodes the data encoded in the electronic tag's integrated circuit (e.g. a user's unique ID). Optionally, a transmitter 270 may transmit the data to the reader 260 for decoding (e.g. in an active tag embodiment). The controller component 255 includes logic which detects multiple tag reads of the same tag within a predetermined number of seconds, and filters out any unwanted reads. The controller 255 date and time stamps the decoded data and transmits this information along with the direction information, e.g. via a transmitter component 270, for receipt by the automated resource scheduler 130.

The automated resource scheduler 130 receives the data from the controller 255 and extracts the unique ID and the direction information from the received data. The receiving component 200 interfaces with an event trigger component 205 and the event trigger component 205 determines if the data has been received from a sensor 120 or a calendar component 230, as the automated resource scheduler 130 may be triggered by identity data (e.g. indicating that a user has entered or exited the location), or by a calendaring function indicating that a meeting has been booked at the location, and that monitoring should begin for user activity.

Depending on which kind of trigger is detected, the event trigger component 205 will either send a request back to the receiving component 200 to begin monitoring for further identity data, or will transmit a request to an analysis component 215 requesting for the processing of this information.

The analysis component 215 interfaces with a calendar component 230. The calendaring function 215 holds location booking information. Such location booking information may, for example, include the dates and times at which rooms are available and unavailable, the capacity of each of the rooms, the facilities available in each of the rooms, and, for each room, the names of each of the participants for one or more meetings.

The analysis component 215 requests from the calendar component 230 location booking status information for the location in which an event has been triggered. For example, if information has been received from sensor 120 located in meeting room 110 at 10:00 am on Tuesday the thirteenth of June, then the analysis component 215 requests status information from the calendar component 230 for meeting room 110 at 10:00 am. The calendar component 230 communicates back to the analysis component 215 the requested information, and the analysis component 215 proceeds to analyze the information to detect any discrepancies between the calendaring status information and the sensor information. Thus, the following situations may occur:

Calendaring Status and Sensor Status:

| Location number | Booking status | Sensor data |
| --- | --- | --- |
| 09:00-10:00 | Booked Users: Mr. A, Mr. B, Miss C, Mrs. T, Mrs. R | Mr. A, Mr. B, Miss C, Mrs. T, Mrs. R |
| 10:00-12:00 | Available | |
| 12:00-13:00 | Booked Users: Miss Z, Mrs. T, Mr. U, Mr. V, Mr. C | Miss Z, Mr. C |
| 13:00-14:00 | Available | Mr. B, Mr. A |
| 14:00-15:00 | Booked | Miss G, Mrs. G, Mr. L, Mr. K, Mr. M |
| 16:00-17:00 | Available | |

The analysis component 215 analyses the above data to detect any discrepancies between the two sets of data (booking status and sensor data). If the analysis components determines any discrepancies, the analysis component 215 determines an appropriate action to be performed. Appropriate actions may, for example, include requesting that the calendaring function update current location booking information with the latest location booking information, and/or sending a notification to a number of users informing them of a status update and/or an action to be performed.

For example, working through the above table—the analysis component 215 may determine that from 9:00 to 10:00 am meeting room 110 has been booked for five users, namely Mr. A, Mr. B, Miss C, Mrs. T, and Mrs. R. The received identity data also shows that the same five users have been detected as entering meeting room 110 at the requested time. Hence on this occasion, the analysis component 215 detects that there are no discrepancies and no further actions need to be taken.

From 10:00 am to 12:00 am meeting room 110 is shown as available. In the event that no identity data is received for meeting room 110 during this time, the analysis component 215 once again determines that no further action is required.

However, from 12:00 am to 13:00 pm location 110 has been booked for Miss Z, Mrs. T, Mr. U, Mr. V, and Mr. C. In the event that identity data has only been received for Miss Z and Mr. C, the analysis component 215 may wait for a further predetermined amount of time (e.g. 5 minutes). If no sensor data has then been received for Mrs. T, Mr. U, nor Mr. V, then the analysis component 215 sends a notification to the notification component 220 requesting that a message be sent to Mrs. T, Mr. U and Mr. V informing them of their absence.

Another scenario is shown with respect to the 13:00 pm to 14:00 pm time slot. The calendaring status information indicates that meeting room 110 is available, but the sensor information showing that Mr. B and Mr. A are in meeting room 110. As the location is available, the analysis component informs the update component 210 that meeting room 110 is now unavailable, and requests that the calendaring status information be updated to reflect the new booking information. The analysis component 215 also communicates with the notification component 220 requesting a notification be sent to Mr. B and Mr. A informing them of their new location booking. Thus the analysis component 215 similarly works through each time slot in the above table to resolve any discrepancies occurring for each time slot.

A further type of scenario is when a user 100 reserves a location for a time period of, for example, two hours, and after the first hour the user and all the user's associated participants leave the location, without returning. If after a predetermined amount of time none of the participants including the user are detected as re-entering the location, then the location's reservation status for the rest of the two hour time period is changed to available.

The automated resource scheduler 130 may be deployable on a server and operable with other calendaring and scheduling software. The server may be a mainframe or other type of server. The server may be operable with a local area network, a wide area network or other type of communication network which is configurable for transmitting and receiving data from on location to another.

Figure 3:
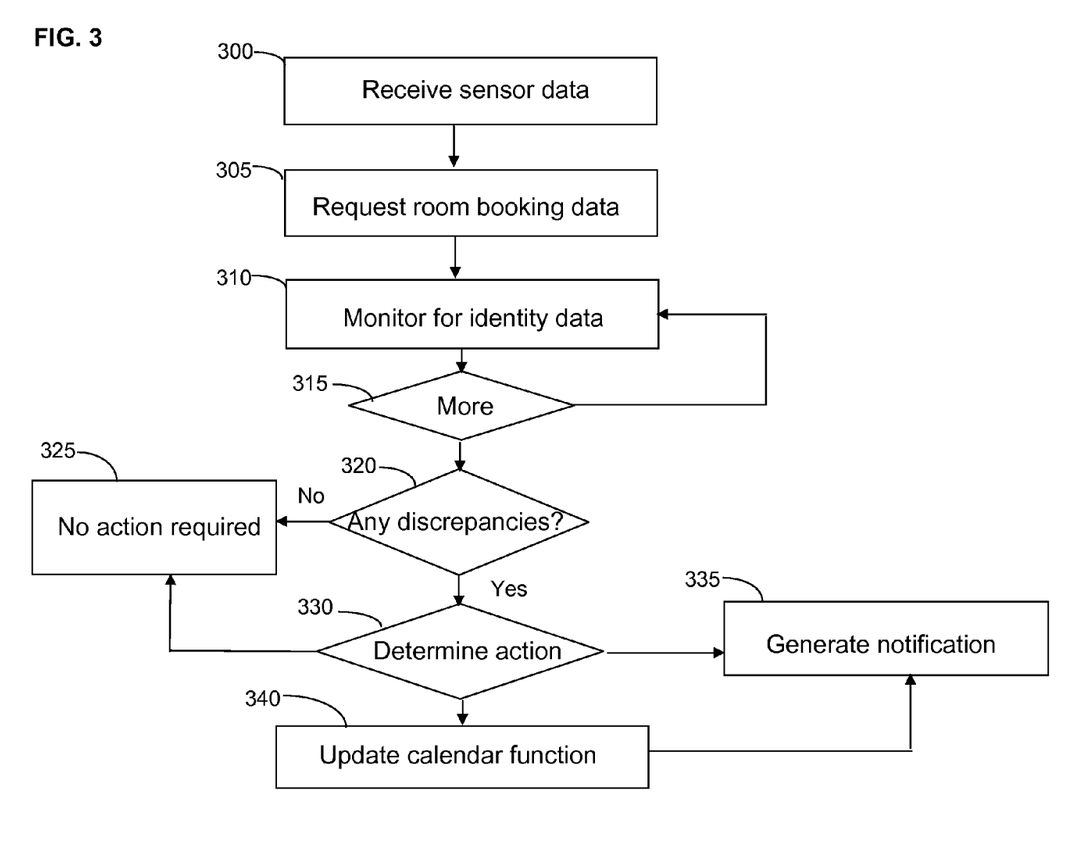
FIG. 3 is flow diagram detailing the operational steps of the automated meeting location scheduler when receiving a trigger from an RFID sensor in accordance with an illustrative embodiment.

FIG. 3 shows the operational steps of an illustrative embodiment of the present invention. The process is initiated by a user 100 entering a location at an entry or exit point 115. The user 100 is carrying an electronic tag 105. The antenna 265 on the electronic sensor 120 (located at the entry and/or exit point) detects a radio wave signal and a reader 260 decodes the encoded user's unique ID for transmitting to the controller component 255. The controller component 255 also receives directional information indicative of whether a user has entered or exited the location. At step 300, a receiving component 200 receives the unique ID of the user and the location number, along with the directional information and a time stamp of the time of the user's entry into or exit from the location. The receiving component 200, via an event trigger component 205, transmits the data to an analysis component 215.

At step 305, the analysis component 215 requests booking status information pertaining to the location that the user was detected entering or leaving. The calendar component 230 sends back the calendar information for the location for that time period that covers the time indicated in the time stamp included with the user's identity data. For example, if the received data includes a time stamp indicating 10:00 am, the calendar component 230 would send back booking status information for the time period of 10:00 am to 11:00 am etc. Alternatively, the calendar component 230 may send back the booking status information for the whole day or partial segments of the day.

The analysis component 215 begins the step of comparing the calendaring status information with the identity data received from the sensor located in the room. First, the analysis component 215 determines whether the location is booked over the time period in question. If yes, the analysis component 215 determines at step 315 whether it has received identity data at step 310 for each user 100 who is registered as having booked the location, or is going to be using the location. If the analysis component 215 has not received all the required sensor data, the analysis component 215 waits for a predetermined amount of time at step 315 before proceeding any further at step 320. After it has waited for the predetermined amount of time, the analysis component 215 determines at step 320 whether there is a discrepancy between the calendaring information (e.g. booking status information) and the identity data (e.g. sensor data). If not, then no action is performed at step 325. Otherwise, an appropriate action is determined at step 330. For example, an appropriate action may be to generate a notification at step 335 via the notification component 220, e.g. requesting that a notification be sent to each of the users who have not attended the meeting. Alternatively, the action determined at step 330 may be no action at step 325.

Thus, if the analysis component 215 receives the required identity data within the prescribed period, the analysis component 215 determines that no further action is needed to be taken. However, if the sensor detects that users are in a location and the calendaring information status information states that the location is available, at step 330 the analysis component 215 may determine that the calendar component 230 is to be updated with new booking information at step 340, and a confirmation notification to be generated at step 335 to the users detected in the location informing them that the location is now booked on their behalf.

Figure 4:
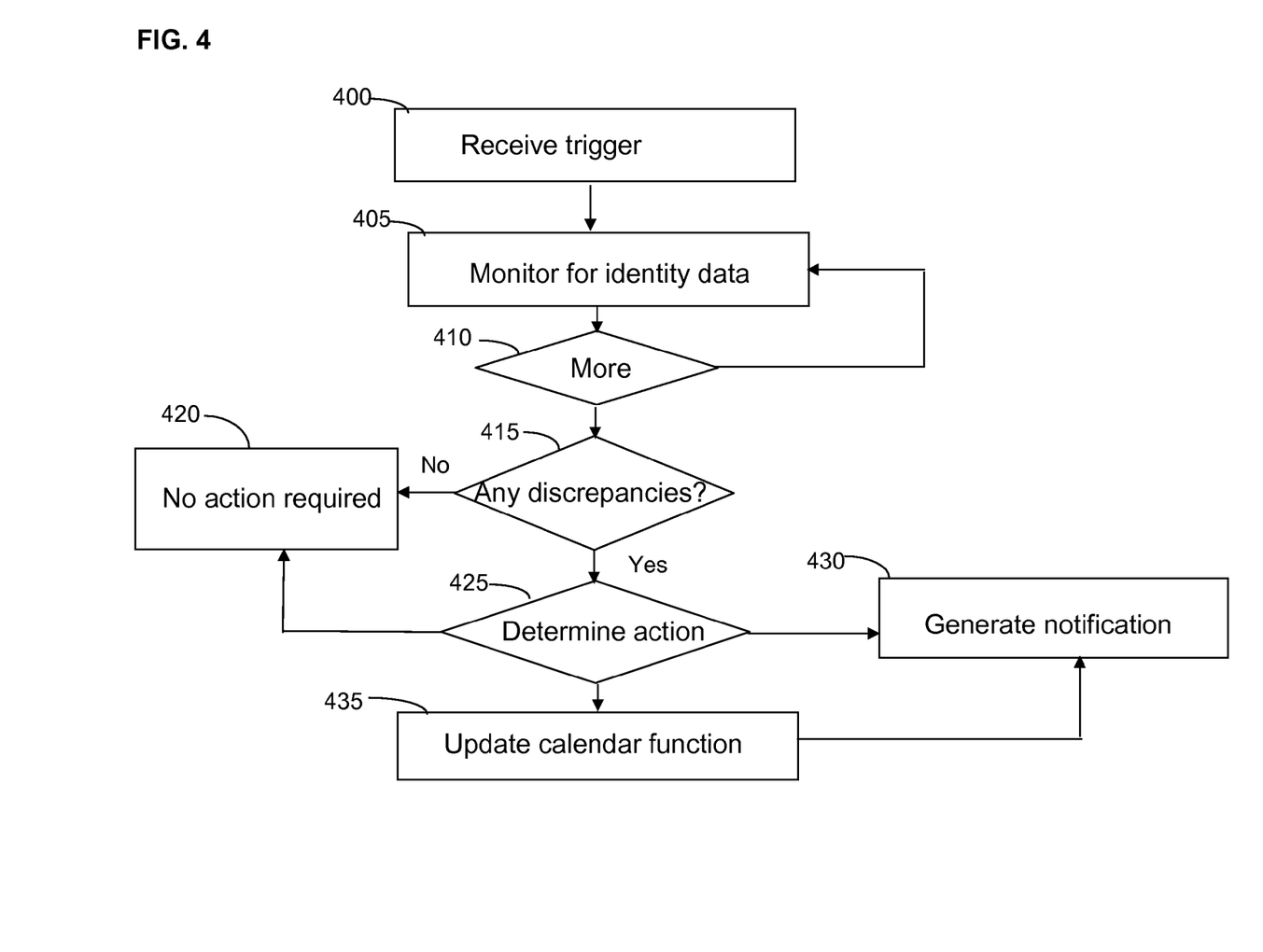
FIG. 4 is a flow diagram detailing the operational steps of the automated meeting location scheduler when receiving an input from a calendaring function in accordance with an illustrative embodiment.

FIG. 4 shows the same operation steps as FIG. 3, but in this example, an initial trigger from the calendar component 230 triggers the receiving component 200 to monitor for identity data for a given date and time. This embodiment is useful for when the calendar component 230 is located remotely, for example on a server located across a network, and/or where the calendar component 230 is a legacy application interfacing with the automated resource scheduling application 130.

At step 400, a receiving component 200 receives a trigger from a calendaring function 230. The trigger may, for example, include a time period in which to monitor at step 405 for identity data from electronic sensor 120 located in meeting room 110. On receipt of the sensor data, the receiving component 200 transmits the data to an analysis component 215. The analysis component 215 requests calendaring status information pertaining to the location that the user was detected entering or leaving. The calendar component 230 sends back the calendaring information for the location for that time period that covers the time notified in the user's identity data. For example, if the identity data indicates the time 10:00 am, the calendar component 230 would send back the status information for the time period of 10:00 am to 11:00 am etc. Alternatively, the calendar component 230 may send back the status information for the whole day or partial segments of the day.

The analysis component 215 begins the step of comparing the calendaring status information with the identity data received from the sensor located in the room. Firstly, the analysis component 215 determines whether the location is booked over the time period in question. If yes, the analysis component 215 determines at step 410 whether it has received identity data for each participant who is associated with the user. If the analysis component 215 has not received all the required sensor data, the analysis component 215 waits for a predetermined amount of time before proceeding at step 415. After it has waited for the predetermined amount of time and if no further identity data has been received, the analysis component 215 determines at step 415 if there is a discrepancy between the calendaring information and the identity data. If not, at step 420 no action is taken. Otherwise, at step 425 it determines an appropriate action to be performed. For example, one appropriate action would be to generate a notification at step 430 via the notification component 220 requesting a notification be sent to each of the users who have not attended the meeting.

Thus, if the analysis component 215 does receive the required identity data within the prescribed period, the analysis component 215 determines that no further action is needed to be taken, and step 415 is followed by step 420. However, in the event that the sensor detects that users are in a location, and the calendaring information status information indicates that the location is available, the analysis component 215 determines that the calendaring function 230 is to be updated at step 435 with the new booking information, and a confirmation notification is generated at step 430 to the user's detected in the location informing then that the location is now booked on their behalf.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. An apparatus, comprising:
    at least one processor and at least one memory, the memory storing executable instructions, the executable instructions, when executed on the processor, implementing
        a receiving component for receiving first identity data from at least one electronic sensor, the first identity data being indicative of a user entering a location at a given time,
        an analysis component for determining, in response to the first identity data, whether the location is available at the given time, and for reserving the location for a meeting having at least one meeting participant including the user in response to determining that the location is available at the given time,
        a notification component for notifying the user of the location's unavailability in the event that the analysis component determines that the location is not available at the given time, wherein the notifying includes informing the user of at least one other time at which the location is available,
        the receiving component further for receiving second identity data from the electronic sensor, the second identity data indicating that all meeting participants have exited the location after a beginning of the meeting and before an end of the meeting, and
        wherein the analysis component further determines whether any meeting participants are detected re-entering the location during a predetermined period of time beginning after all meeting participants have exited the location and ending before the end of the meeting, and updates scheduling records to indicate that the location is again available for use responsive to determining that none of the meeting participants are detected re-entering the location during the predetermined period of time.

2. The apparatus of claim 1 wherein the analysis component reserves the location by transmitting a request to a calendar component requesting that the location be reserved for use by the user.

3. The apparatus of claim 2 wherein the calendar component reserves the location for use by the user until a next reserved temporal time slot.

4. The apparatus of claim 1 wherein if subsequent identity data is received and determined by the analysis component to not be associated with any meeting participant, the notification component generates a notification that the location is not available for use.

5. The apparatus of claim 3 wherein the notification component further generates a notification informing the user of the reservation of the location.

6. The apparatus of claim 1 wherein the notification component is operable to provide the notification by one of the set consisting of electronic mail, instant messaging, and voice communication.

7. The apparatus of claim 1, wherein the user's entering the location is detected in response to an electronic tag.

8. The apparatus of claim 7, wherein the electronic tag comprises an RFID tag.

9. The apparatus of claim 7, wherein the electronic tag is detectable by the electronic sensor.

10. The apparatus of claim 9, wherein the electronic sensor is locatable at an entry point at the location.

11. The apparatus of claim 7, wherein the electronic tag is connectable to the user.

12. The apparatus of claim 7, wherein the electronic tag is embedded within an identity means.

13. A method for temporally associating a user with a location, comprising:
    receiving first identity data from at least one electronic sensor, the first identity data being indicative of a user's entering a location at a given time;
    determining, in response to the first identity data, whether the location is available at the given time;
    reserving the location for a meeting having at least one meeting participant including the user in response to determining that the location is available at the given time;
    notifying the user of the location's unavailability in the event that the location is not available at the given time, wherein the notifying includes informing the user of at least one other time at which the location is available;
    receiving second identity data from the electronic sensor, the second identity data indicating that all meeting participants have exited the location after a beginning of the meeting and before an end of the meeting;
    determining whether any meeting participants are detected re-entering the location during a predetermined period of time beginning after all meeting participants have exited the location and ending before the end of the meeting; and
    updating scheduling records to indicate that the location is again available for use responsive to determining that none of the meeting participants are detected re-entering the location during the predetermined period of time.

14. The method of claim 13 wherein the location is reserved by transmitting a request to a calendar component requesting that the location be reserved for use by the user.

15. The method of claim 14 further comprising reserving the location for use by the user until a next reserved temporal time slot.

16. The method of claim 13 further comprising, in the event that further identity data is received and determined to not be associated with any meeting participant, generating a notification that the location is not available for use.

17. The method of claim 15 further comprising generating a notification informing the user of the reservation of the location.

18. The method of claim 13, wherein the notifying is by one of the set consisting of electronic mail, instant messaging and voice communication.

19. The method of claim 13, wherein the user's entering the location is detected by way of an electronic tag.

20. The method of claim 19, wherein the electronic tag comprises an RFID tag.

21. The method of claim 19, wherein the electronic tag is detected by the electronic sensor.

22. The method of claim 21, wherein the electronic sensor is located at an entry point at the location.

23. The method of claim 18, wherein the electronic tag is connected to the user.

24. The method of claim 15, wherein the electronic tag comprises an identity means.

25. A computer program product comprising:
- a non-transitory computer readable storage medium, the non-transitory computer readable storage medium having computer program code stored thereon, which when executed would cause the computer system to temporally associate a user with a location, the program code comprising:
    - a receiving component for receiving first identity data from at least one electronic sensor, the first identity data being indicative of a user entering a location at a given time,
    - an analysis component for determining, in response to the first identity data, whether the location is available at the given time, and for reserving the location for a meeting having at least one meeting participant including the user in response to determining that the location is available at the given time,
    - a notification component for notifying the user of the location's unavailability in the event that the analysis component determines that the location is not available at the given time, wherein the notifying includes informing the user of at least one other time at which the location is available,
    - the receiving component further for receiving second identity data from the electronic sensor, the second identity data indicating that all meeting participants have exited the location after a beginning of the meeting and before an end of the meeting, and
    - wherein the analysis component further determines whether any meeting participants are detected re-entering the location during a predetermined period of time beginning after all meeting participants have exited the location and ending before the end of the meeting, and updates scheduling records to indicate that the location is again available for use responsive to determining that none of the meeting participants are detected re-entering the location during the predetermined period of time.

* * * * *